United States Patent [19]

Dixit et al.

[11] Patent Number: 5,060,285
[45] Date of Patent: Oct. 22, 1991

[54] HIERARCHICAL VARIABLE BLOCK SIZE ADDRESS-VECTOR QUANTIZATION USING INTER-BLOCK CORRELATION

[75] Inventors: Sudhir S. Dixit, Norwood; Yushu Feng, Worcester, both of Mass.

[73] Assignee: GTE Laboratories Incorporated, Waltham, Mass.

[21] Appl. No.: 354,646

[22] Filed: May 19, 1989

[51] Int. Cl.$^5$ ............................................. G06K 9/36
[52] U.S. Cl. ...................................... 382/56; 382/54; 358/433
[58] Field of Search ........................ 302/56, 54, 21, 50, 302/37, 38; 358/452, 433, 432, 429, 262.1, 261.4, 261.3, 453, 133, 448, 467; 375/25, 26; 381/29, 30, 34, 35

[56] References Cited

U.S. PATENT DOCUMENTS

| | | | |
|---|---|---|---|
| 4,712,140 | 12/1987 | Miatzer et al. | 358/433 |
| 4,780,761 | 10/1988 | Daly et al. | 358/133 |
| 4,791,654 | 12/1988 | De Marca et al. | 375/12 |
| 4,797,739 | 1/1989 | Tanaka | 358/133 |
| 4,809,350 | 2/1989 | Shimoni et al. | 382/56 |
| 4,831,659 | 5/1989 | Miyaoka et al. | 358/433 |
| 4,922,349 | 5/1990 | Abe et al. | 358/433 |
| 4,932,066 | 6/1990 | Nakayama et al. | 382/56 |
| 4,947,447 | 8/1990 | Miyaoka et al. | 382/56 |
| 4,951,157 | 8/1990 | Koh et al. | 358/433 |
| 5,020,120 | 5/1991 | Weldz | 382/56 |

OTHER PUBLICATIONS

Adaptive Vector Quantization of Video for Packet Switched Networks, Dixit, S. S. and Feng, Yusho, to be published in Proceedings of IEEE 1989 Int. Conf. on Acoustics, Speech and Signal Processing, Glasgow, May 23, 1989.

A New Vector Quantization Scheme Using Interblock Correlation: Address Vector Quantizer, Y. Feng and N. M. Nasrabadi, IEEE Globecom 1988.

Primary Examiner—Michael Razavi
Attorney, Agent, or Firm—Victor F. Lohmann, III

[57] ABSTRACT

A vector quantization based image compression technique which exploits inter-block correlation and layered addressing structure to form variable block sizes. Without introducing any quality degradation, when compared to the traditional vector quantization algorithms, the invention described herein significantly increases the compression and reduces the bit rate. The concept of inter-block correlation is utilized to form variable size blocks, which are then coded using a hierarchical coding model. The method is based on starting off from a small basic block which is allowed to grow to a maximum of a preset block size as long as certain conditions are met. The basic idea of growing the block is based on the renormalization group theory in physics. The algorithm utilizes only one pixel code book for the basic block size and several address code books for the layer block sizes to encode an image. S/N ratio in excess of 30dB at bit rates lower than 0.2 bpp are easily obtained.

10 Claims, 4 Drawing Sheets

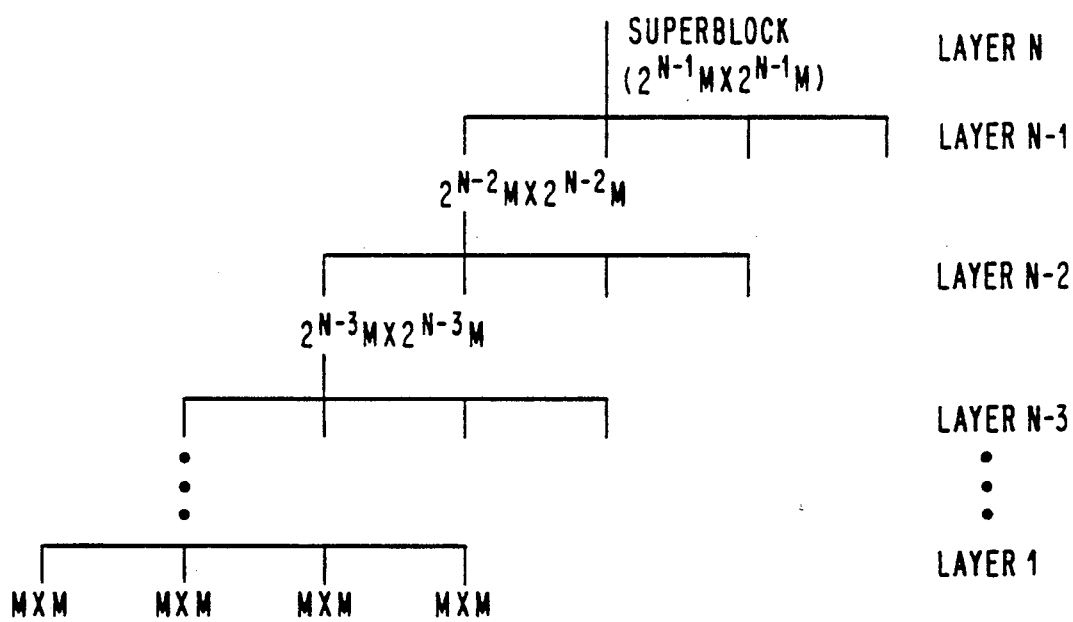
Fig. 3.
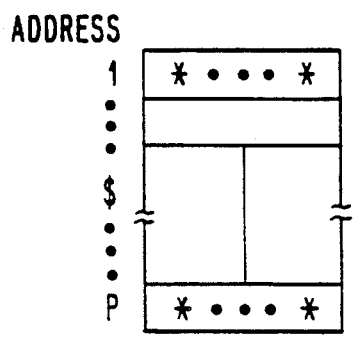
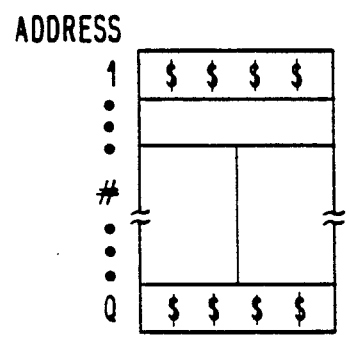
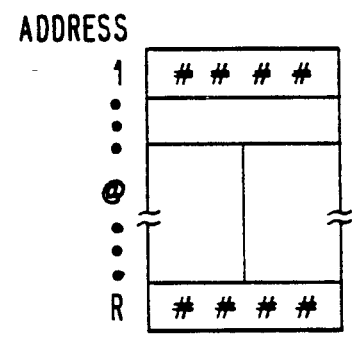
Fig. 4a.    Fig. 4b.    Fig. 4c.

HIERARCHICAL VARIABLE BLOCK SIZE ADDRESS-VECTOR QUANTIZATION USING INTER-BLOCK CORRELATION

BACKGROUND OF THE INVENTION

This invention pertains to the compression of images for transmission over networks and their reconstruction upon reception. In particular, it pertains to the compression and reconstruction of image signals using inter-block correlation and a layered addressing structure to form variable block sizes to increase compression and reduce bit rate.

Vector quantization has been applied to speech coding for a number of years. However, the application of vector quantization to image coding is relatively new. Vector quantization for reducing bit-rate has been found to be a very efficient technique due to its inherent ability to exploit correlation between neighboring pixels. Vector quantization has been applied both in the spatial and transformed domain in various forms. In its basic form, as illustrated in the block diagram of FIG. 1, an image is divided into blocks of N×N pixels. In the transmitter and receiver identical code books 15 exist whose entries contain combinations of pixels in a block 31 (FIG. 6). Assuming that there are M shades of gray in an image, theoretically, $(M)^{N \times N}$ combinations are possible. In practice, however, there are only a limited number of combinations that occur most often, which reduces the size of the code table or code book considerably. The code book is created by training it over a large set of test images of different types. During the coding process, each block of the actual image 10, being compressed is compared 12 with entries 14 in the code book 15, and the address of that entry, which best matches using the nearest neighbor rule, the image being compressed or encoded is transmitted 16 to the receiver. On the receive side, the received address is used to fetch 17 the same block 14 from the code book 15, which is then used to reconstruct the image 19. Typical block 14 and code book 15 sizes that are used are 4×4 and 256, respectively. Since it takes 8 bits to address an entry in the code book, a compression factor of 16 or bit rate of 0.5 bit per pixel is achieved, assuming that the original image is made up of 256 shades of gray. U.S. Pat. No. 4,797,739 issued to Tanaka is representative of the prior art.

Two major problems of vector quantization are: how to design a good code book that is representative of all the possible occurrences of pixel combinations in a block, and how to find a best match in the code book during the coding process. Some researchers have suggested various clustering techniques to design good code books. Tree searched algorithms have been used to speed up the code vector search process. A good overview of vector quantization can be found in Gray, IEEE ASSP Magazine, Apr. 1984, pp. 4–29. This invention does not relate to either the code table design or the search process. Rather, it deals with how we can exploit inter-block correlation to design variable block size vector quantization, and how to structure the code tables in an inter-related manner to further increase compression.

Traditional approaches to vector quantization rely on partitioning an image into blocks of equal size to exploit correlation between neighboring pixels. This concept can be further extended to inter-block correlation to design variable block size vector quantization. Vaisey and Gersho have published a variable block size coding technique, in which a 32×32 block is tested to determine if it should be further subdivided into 4 blocks of 16×16. Again, the 16 ×16 blocks are subdivided into four 8×8 blocks if certain conditions are not met, and this process continues until it is not necessary to further subdivide the blocks or the basic block size of 4×4 is reached. The decision to generate (or not to generate) 4 children is made by the following process: assuming that an N×N block is being tested, first the pixel mean is calculated in the block and the corresponding quantized pixel mean is subtracted from each pixel in the block to produce a residual block. Then, the variance of the pixels in the block is calculated, and if this variance exceeds a pre-set threshold, then the block is subdivided to generate 4 children; else, we code the block as it is. Thus, the large block is described by two quad-trees: the detail tree and the mean tree. The detail tree provides the segmentation information. The residual blocks of size 32×32, 16×16, and 8×8 blocks are first transform coded, then vector coded using the corresponding code tables. Residual blocks of size 4×4 are vector coded directly (in the spatial domain). The major problems of this technique are: need to send detail and mean tree side information, complex segmentation process, use of several code tables, and need to do block transform. Daly and Hsing have reported using large blocks of 16×16, then subdividing them into four children based on a detail criteria, and so on, until either the detail test is met or the basic block size of 2×2 is reached. There are four different code tables, one for each block size. So, this technique is basically straightforward, but intensive in terms of computing and memory requirements.

Feng and Nasrabadi "A new vector quantization scheme using interblock correlation: address-vector quantizer", Proc. GlobeCom, Ft. Lauderdale, Fla. 1988 have proposed an address-vector quantizer where four basic blocks are combined into one larger block, and are coded by using an address code book. The address code book consists of a set of address code vectors where each address code vector represents a combination of blocks, and each of its elements represents address of an entry in the code book designed for the basic block vectors. The address code book itself is very large, and is divided into active and passive sections.

SUMMARY OF THE INVENTION

A principle object of the invention is to provide a vector quantization technique which achieves a significant reduction in bit rate.

A further object of the invention is to provide a vector quantization technique which significantly reduces the duration of variable block segmentation and code vector search processes.

Still a further object of the invention is to provide a vector quantization technique which is neither memory intensive nor computationally intensive.

In contrast to the above variable block size coding techniques which rely on starting from a very large block and continually generating 4 children until certain segmentation criteria are not met, the invention is based on starting off from a small basic block which is allowed to grow to a maximum of a preset block size, called the super block, if certain conditions are met. Either each basic block, or combinations of basic or larger blocks within the super block, or the super block itself is coded by a single code word. As opposed to utilizing different code books for different block sizes, it uses only one pixel vector code book, designed for the basic block size, and in addition, builds other address vector code books for higher layers whose entries consist of combinations of four addresses of the entries in the lower layer code book.

In one aspect of the invention, a method of compressing and reconstructing an image by hierarchical variable block-size address-vector quantization, comprises several major steps. The first major step is to design a set of code books. Initially an image is partitioned into basic blocks of equal size to form a first layer of blocks, each basic block having the same number of pixels. Then a first layer pixel vector code book is compiled having a plurality of addressable entries, each entry representing a cluster of basic blocks of a set of training images. Next, groups of adjacent basic blocks of said first layer are combined to form a second layer of blocks. Then an address code book for said second layer blocks is compiled having a plurality of addressable entries wherein said entries are addresses of combinations of code vectors in said first layer code book which have the highest probability of occurrence. After determining a maximum block size and the number of layers N required to encode a maximum size block, then if $N \geq 2$, combining groups of adjacent blocks from layer $i-1$ to form a layer i block where $1 < i \leq$.

For each subsequent layers an address code book is compiled for the ith layer of blocks having a plurality of addressable entries wherein said entries are those combinations of address vectors in the $i-1$ layer code book which have the highest probability of occurrence. The code books are then stored such that they may be used for both compression and reconstruction of the same image signals.

The next major steps pertain to encoding an image for compression. Each newly arriving image is divided into blocks of maximum size and each of said maximum size blocks of said newly arriving image is divided into basic blocks.

Then each of said basic blocks of said maximum size block is compared with entries in said first layer vector code book to find the best matches of all said basic blocks in said maximum block. Next, the address code book of said second layer is scanned to determine if there is an entry representing combinations of addresses of the best matches of adjacent basic blocks in said first layer code book. If all basic blocks of said first layer within the larger block of said second layer can be encoded by a single address in said second layer address code book, then adjacent blocks of said second layer are combined to form a larger block of a third layer. Next, the address code book of said third layer is scanned to determine if there is an entry representing the combination of addresses of second layer blocks. If such an entry exists, then repeating the iterative steps of combining the blocks of layer $i-1$ to form a block of layer i are repeated and the address code book of layer i is scanned to find a single entry which represents the combination of addresses of blocks of layer $i-1$ in said layer i block.

The process terminates these iterative steps upon occurrence of one of the following events: the maximum block size is reached and encoded; or all of the component blocks of a block in layer i cannot be encoded by a single address vector entry in the address code book of layer i. At this point the image is encoded and the transmitter sends a tree message with block combination information and the code book addresses of the encoded image to a receiver for reconstruction of said image after transmission.

In a second aspect of the invention, the size of a basic block is $M \times M$ pixels; and said basic blocks are recursively combined in groups of four, such that each entry in an address code book of layer i, where $2 < i \leq N$, contains four addresses of vectors in a code book of layer $i-1$.

In a third aspect of the invention said first layer code book contains 128 vectors, said second layer code book contains 1024 address vectors, and said third layer code book contains no address vectors.

BRIEF DESCRIPTION OF THE DRAWINGS

FIG. 3 is a quad-tree representation of a variable block size structure according to the invention;

FIGS. 4a-4c illustrate code books for layers 1 to 3, according to the invention;

DESCRIPTION OF THE PREFERRED EMBODIMENT

Figure 1:
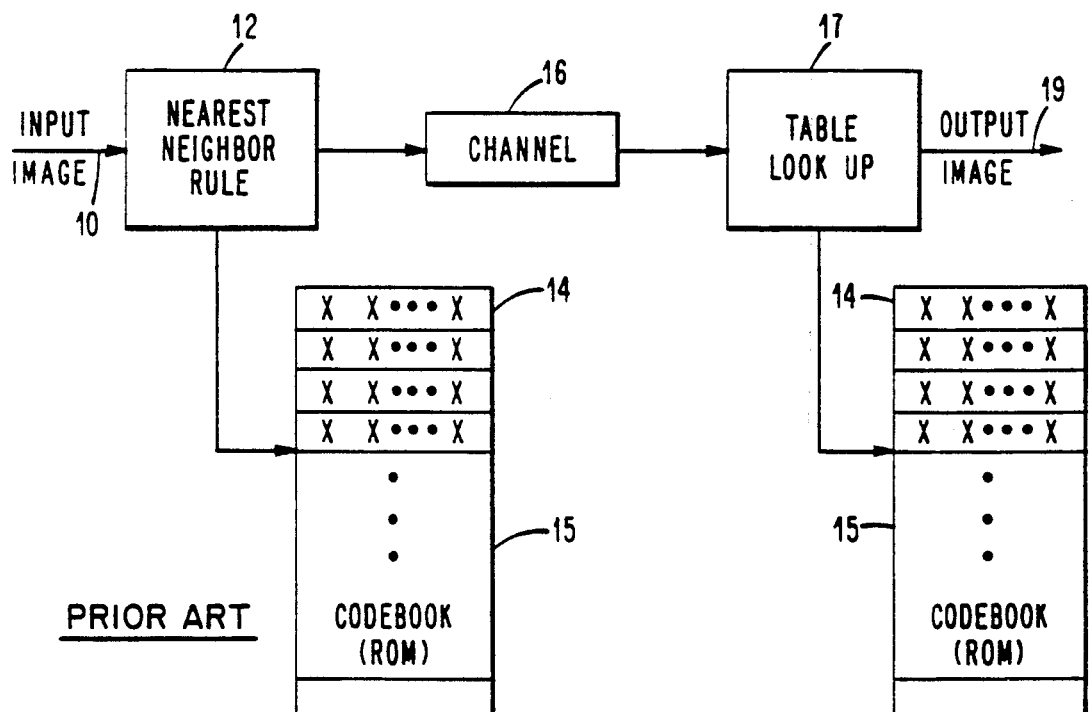
FIG. 1 is a block diagram of a typical vector quantization process of the prior art.
Figure 2A:
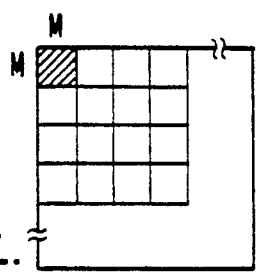
FIGS. 2a-2d show blocks of $M \times M$, $2M \times 2M$, $4M \times M$, and $2^{N-1}M \times 2^{N-1}M$ pixels in a layered structure, according to the invention.
Figure 2B:
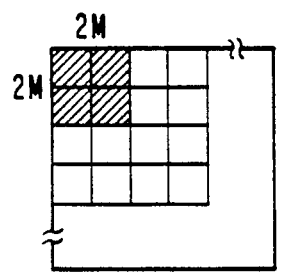
Figure 2C:
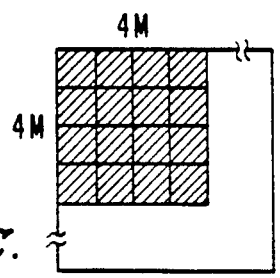
Figure 2D:
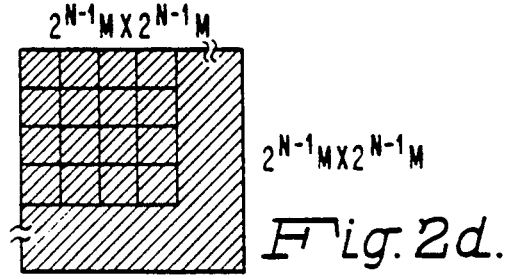

This invention pertains to a vector quantization-based image compression technique which exploits interblock correlation and layered addressing structure to form variable block sizes. Without introducing any quality degradation, when compared to the traditional vector quantization (VQ) algorithms, the invention described herein significantly increases the compression and reduces bit rate.

In contrast to variable block-size coding techniques which rely on starting from a very large block and continually generating four children until certain segmentation criteria are not met, the invention is based on starting off from a small basic block which is allowed to grow to a maximum of a pre-set block size, called the super block, if certain conditions are met. Either each basic block, or combinations of basic or larger blocks within the super block, or the super block itself is coded by a single code word. As opposed to utilizing different code books for different block sizes, it uses only one pixel vector code book, designed for the basic block size, and in addition, it builds other address vector code books for higher layers whose entries consist of combinations of four addresses of the entries in the lower layer code book. In this specification, layer 1 refers to a basic block of $M \times M$ pixels, layer 2 to blocks of size $2M \times 2M$, layer 3 to blocks of size $4M \times 4M$, and so on, as shown in FIG. 2. Assuming that the super block size is $2^{N-1}M \times 2^{N-1}M$, where N is the number of layers, in FIG. 2a there are $2^{2(n-1)}$ basic blocks of $M \times M$ pixels in layer 1; in FIG. 2b, there are $2^{2(n-2)}$ blocks of $2M \times 2M$ pixels in layer 2; in FIG. 2c there are $2^{2(N-3)}$ blocks of 4M×4M pixels in layer 3; and in FIG. 2d there is one block of $2^{N-1}M \times 2^{N-1}M$ pixels in layer N. To build a block for layer i, $1 < i \leq N$, the block from layer i−1 is combined with three neighboring blocks in the vertical, horizontal and 45° (or 135°) diagonal directions. Square blocks are the most efficient and therefore are used for purposes of exposition in this specification.

The layered code books, described above, are designed by training on a large database of images. The layer 1 code book is designed using any standard code book design algorithm, e.g., the Generalized Lloyd Algorithm (GLA). The layer 2 code book is made up of combinations of those code vectors in layer 1 which have the highest probability of occurrence, and so on. Code books for layers higher than 1 are called address code books, as each entry of these code books contains 4 addresses representing either the addresses of 4 (pixel) code vectors (in layer 1 if designing layer 2 address code book) or if layer i, then addresses of 4 address vectors in the code book belonging to the next lower layer i−1. The structure and relationship among the various code books is better explained in FIG. 3 and 4.

It would seem that there would be a very large number of combinations possible of blocks in layer i derived from layer i−1. But, our experimental results have shown that there are only a limited number of combinations of blocks, in each layer, which occur with high probability, enabling us to retain only a predetermined number of highly correlated blocks. Our experience suggests that for a 256 vector code book of layer 1, 2048 address vectors in layer 2, and 1048 address vectors in layer 3 are generally sufficient to encode a wide variety of images.

FIGS. 4a–c illustrate the structure of the basic (pixel) code book and the address code books. FIG. 4a shows a layer 1 pixel code book of $M^2$ dimensional vectors derived from GLA or another algorithm. The addresses range from 1 to P. There are 16 pixel values at each address in the layer 1 code book. FIG. 4b shows a layer 2 address code book containing the addresses of the $M^2$ dimensional vectors in the layer 1 pixel code book of FIG. 4a. $ represents the address of a vector in layer 1, a number in the range 1 to P. There are four addresses from layer 1 at each address in layer 2. FIG. 4c shows a layer 3 code book containing addresses of address vectors in the layer 2 code book of FIG. 4b. # represents the address of an entry in the layer 2 address code book, a number in the range 1 to Q. There are four layer 2 code book addresses in each entry of the layer 3 code book.

To encode an image, first the best matches of all the basic blocks (of size M×M) in a super block are found from the basic code book of layer 1, then the address code book of layer 2 is scanned to determine if there exists an entry representing combinations of these blocks from layer 1. If all the 4 blocks of size M×M within the larger block of size 2M×2M, in layer 2, can be encoded by the address code book of layer 2, then these blocks of size 2M×2M are further combined to give a still larger block size of 4M×4M. Then the entries in the layer 3 address code book are scanned to determine if there is an entry representing combinations of these blocks from layer 2, as before. If such an entry is found, the process continues into higher layers. This iterative process terminates when either the full super block size is reached or all four blocks, in layer i (i>1), of size $2^{i-1}M \times 2^{i-1}M$ cannot be encoded by a single entry (address vector) in layer i address code book. At the terminating point, a quad-tree message, along with the code book indices, is sent out to the receiver.

Figures 5A, 5B, 5C, 5D:
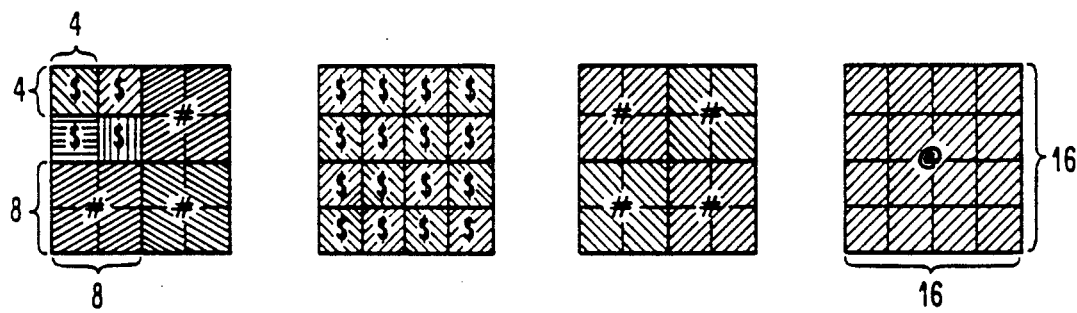
FIGS. 5a-5d illustrate examples of the correlation between the code books of FIGS. 4a-4c and the blocks of layered pixels of FIGS. 2a-2d, according to the invention.

This process is illustrated in FIGS. 5a–d. Assume that the basic block size is 4×4 pixels (M×M, where M=4), and the super block size is 16×16 (4M×4M), and use $ to designate an address in the layer 1 code book; # to designate an address in the layer 2 code book; and @ to designate an address in the layer 3 code book. FIG. 5a shows four blocks of 4×4 pixels (M×M) which are coded by four layer 1 code book addresses $ and three blocks of 8×8 pixels (2M×2M) which are coded by three layer 2 address code book addresses. FIG. 5b illustrates sixteen blocks of 4×4 pixels (M×M) which are coded by sixteen layer 1 code book addresses. FIG. 5c illustrates four blocks of 8×8 pixels (2M×2M) which are coded by four layer 2 address code book addresses. FIG. 5d illustrates one super block of 16×16 pixels (4M×4M) which is coded by one layer 3 address code book address.

For example, to encode the super blocks (of size 16×16) of FIGS. 5a–5d, the following bit streams will be generated:

FIG. 5(a) 11$$$$0#0#0#
FIG. 5(b) 11$$$$1$$$$1$$$$1$$$$
FIG. 5(c) 10#0#0#0#
FIG. 5(d) 0@ where 0 or 1 bits are quad-tree information bits, denoting whether or not blocks have been further subdivided, $ represents the address of a code book entry in layer 1, # represents the address of a code book entry in layer 2, and

@ represents the address of a code book entry in layer 3.

The above coding and addressing schemes can be generalized to any number of layers.

The techniques disclosed in this specification were verified in small scale experiments involving code book construction based on analyses of eleven gray scale images and the analysis of two images, both before compression and after reconstruction. The results were as follows.

Figure 6:
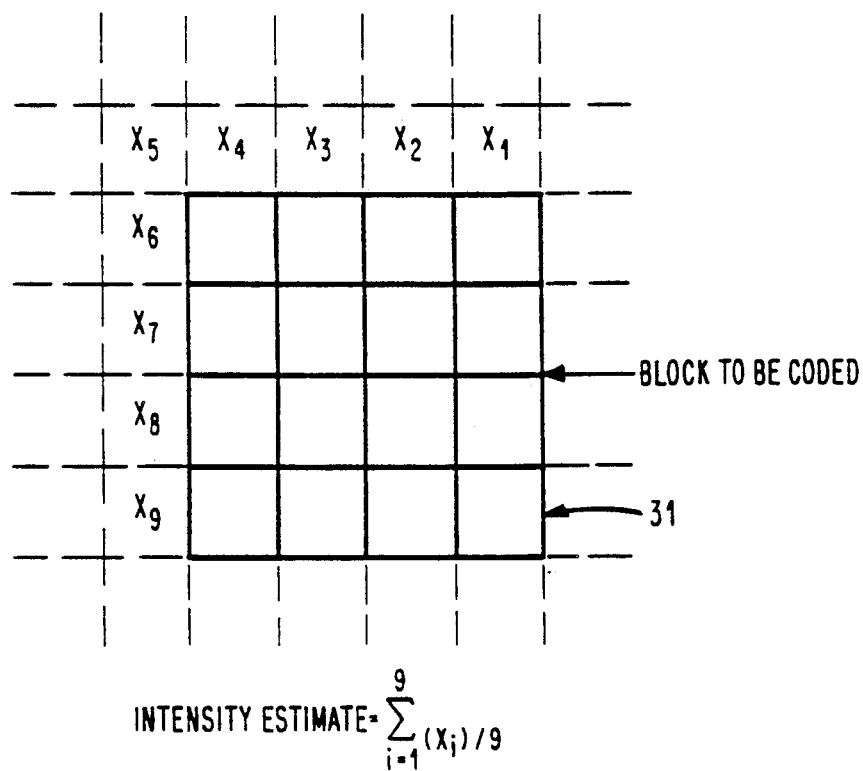
FIG. 6 is a diagram to illustrate the estimation of average intensity of a block to be coded according to the invention.

A basic code book of 128 vectors, representing a block size of 4×4 pixels, was trained over a database of 11 gray scale images of size 512×512. The GLA algorithm was used to design the code book, and seed code vectors were derived by using a pair-wise nearest neighbor (PNN) algorithm over the same database of images. The average intensity of each block was removed so that only a shape vector is encoded. This removal of average intensity also permits a wide variety of images with varying background intensities to be represented by the same set of code books (basic and address). The average intensity itself is estimated by those neighboring pixels which have already been decoded, as shown in FIG. 6. This approach does not require sending of the mean intensity as side information, which results in higher compression without adversely affecting the image quality.

The super block size to which the basic block was allowed to grow was limited to 16×16 pixels, which meant that there were 2 address vector code books, one each for layer 2 and layer 3. Several sizes of layer 2 and layer 3 code books were experimented with. These address code books were designed by training on the same database of images as the one used for designing the basic code book. The entries of the code books were ordered in the descending order of the probability of occurrence of the combinations of the smaller blocks belonging to the lower layer. It is to be noted that the code books need to be trained only once, and are used to encode any image.

Figure 7:
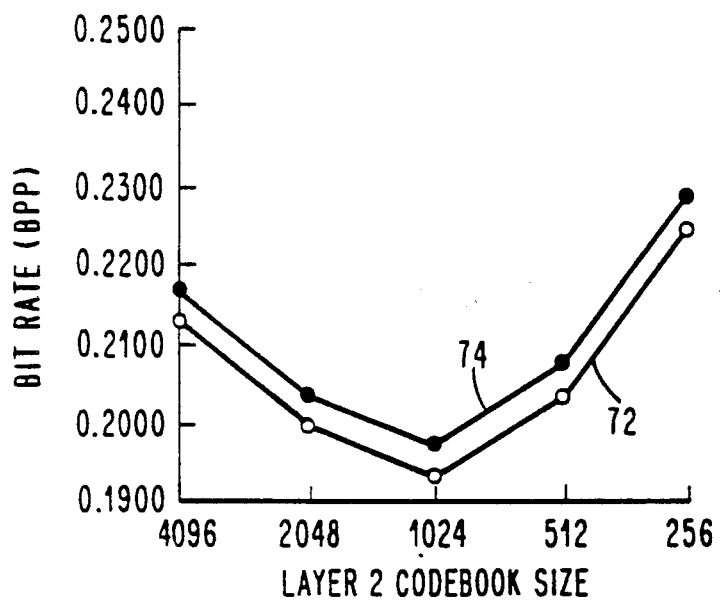
FIG. 7 is a graph illustrating the variation in bit rate for different size code books for an image.
Figure 8:
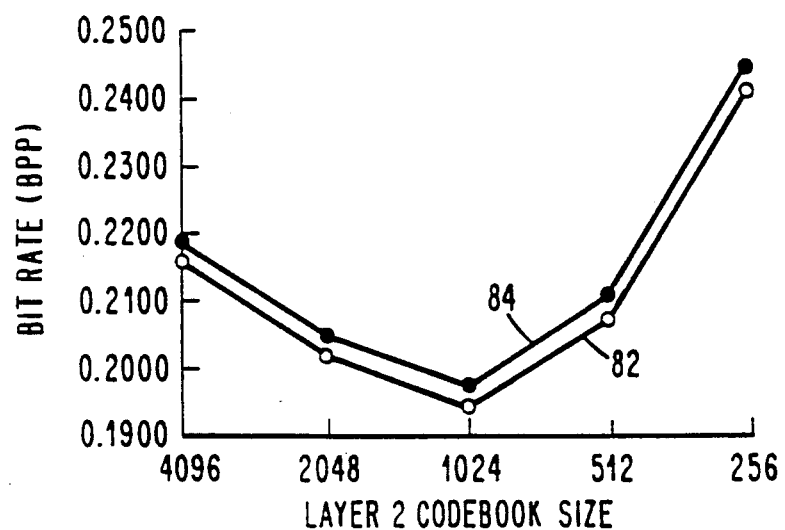
FIG. 8 is a similar graph to that of FIG. 7 for a different image.

Several original and decoded images, not reproduced here, were utilized. One image 'Lenna' was not in the set of training images while 'Flower' was. These images were coded by different size code books for layers 2 and 3. The bit rates and the number of blocks coded by each layer varied as a function of the code book sizes, as shown in FIGS. 7 and 8. FIG. 7 plots the variation in bit rate for the image 'Lenna' when the sizes of the code books for layers 2 and 3 were varied for a single test image. The layer 1 code book was fixed at 128 vectors. When the layer 3 code book size is varied between 0 (reference number 72) and 1024 (reference number 74) address vectors, the plotted points will lie between the two plotted lines 72, 74.

FIG. 8 plots the variation in bit rate for the image 'Flower' when the sizes of code books for layers 2 and 3 are varied. The layer 1 code book is fixed at 128 vectors. When the layer 3 code book size is varied between 0 (reference number 82) and 1024 (reference number 84) address vectors, the plotted points will lie between the two plotted lines 82, 84.

As expected when the size of the layer 2 code book is reduced from 4096 through to 1024, the bit rate reduces correspondingly. This is due to the fewer bits needed to encode layer 2 blocks, which more than offsets a slight increase in the bit rate because of a marginal reduction in the number of blocks encoded by the layer 2 code book. When the size of the layer 2 code book is further reduced, e.g., 512 or smaller, the bit rate begins to increase because of a significant reduction in the number of blocks encoded by layer 2, thus reducing the utilization of inter-block correlation. This phenomenon increases the number of basic blocks coded by layer 1. Thus, the advantage of smaller code word size for layer 2 code vectors is offset by a large number of blocks that have to be coded by the layer 1 code book resulting in increased coded and quad-tree bits.

Whereas the variation in the layer 2 code book size results in a bit rate plot which has a minima when code book sizes of other layers are fixed, a somewhat different observation is made when a layer 3 (or higher) code book size is varied. Reducing the layer 3 code book size lowers the overall bit rate, and a minimum is obtained when the size is reduced to zero, i.e., layer 2 blocks are not further combined to produce still larger blocks. This implies that a super block size of 8×8 pixels is optimum. block size of 16×16 and above diminishes significantly to the point that the overhead of quad-tree segmentation bits becomes a dominant factor and is not offset by a sufficient number of large blocks coded by fewer bits. Statistically, only 50% of the total number of images coded made use of a layer 3 code book when it contained 512 or 1024 address-vectors, and this figure dropped as the size of the code book was further reduced. Furthermore, in cases where the layer 3 code book does get used, fewer than 0.9% of basic blocks (out of a total of 16,384) are coded by the layer 3 code book. It is further observed that well over 91% of the basic blocks are coded by a layer 2 code book when the optimum code book sizes are 128 and 1024 for layers 1 and layer 2, respectively, and the super block size is 8×8. Of course, as the size of code books is varied, the number of blocks coded by each layer changes correspondingly along with the number of quad-tree overhead bits. The above optimum sizes are empirically determined based on the various trade-offs involved.

Tables 1 and 2 provide data on the number (and percentage) of basic blocks coded by the various layers, the overall bit rate, and the peak S/N ratio for each image discussed earlier. An optimum code book size of 1024 for layer 2 has been used in both the Tables.

TABLE I

Performance of hierarchical variable block size address vector quantization for image 'Lenna'

| Code book size: | | | |
|---|---|---|---|
| | Layer 1 | 128 | 128 |
| | Layer 2 | 1024 | 1024 |
| | Layer 3 | 1024 | 0 |
| Blocks coded by # (%)* | Layer 1 | 1240 (7.57) | 1240 (7.57) |
| | Layer 2 | 15,144 (92.43) | 15,144 (92.43) |
| | Layer 3 | 0 (0) | 0 (0) |
| Total number of compressed bits | | 51,660 | 50,636 |
| Overall bit rate (bpp) | | 0.1971 | 0.1932 |
| S/N ratio (dB) | | 30.7 | 30.7 |

*Total number of blocks of size 4 × 4 pixels in an image of size 512 × 512: 16,384

TABLE 2

Performance of hierarchical variable block size address quantization for image 'Flower'

| Code book size: | | | |
|---|---|---|---|
| | Layer 1 | 128 | 128 |
| | Layer 2 | 1024 | 1024 |
| | Layer 3 | 1024 | 0 |
| 4 × 4 Blocks coded by # (%)* | Layer 1 | 1324 (8.08) | 1324 (8.08) |
| | Layer 2 | 14,916 (91.04) | 15,060 (91.92) |
| | Layer 3 | 144 (0.88) | 0 (0) |
| Total number of compressed bits | | 51,732 | 51,014 |
| Overall bit rate (bpp) | | 0.1973 | 0.1946 |
| S/N ratio (dB) | | 31.3 | 31.3 |

*Total number of blocks of size 4 × 4 pixels in an image of size 512 × 512: 16,384

Peak S/N ratio of over 30 dB is obtained at bit rates lower than 0.2 bit per pixel. If the same images were coded by the basic code book of 128 vectors (without using other layers), a bit rate of 0.4375 bpp will be obtained. Thus, it is readily seen that the hierarchial variable block size vector quantization coding model disclosed herein delivers over 55% reduction in the bit rate without incurring any loss in image quality.

Traditional approaches to vector quantization require the partitioning of an image into blocks of equal size to exploit correlation between neighboring pixels. A new hierarchical variable block size vector quantization algorithm has been disclosed which further exploits inter-block correlation providing the same level of performance, in terms of image quality, as that obtained when using the basic vector quantization algorithm, but at a significantly reduced bit rate. The algorithm differs from other published variable block size coding techniques in that the approach relies on starting off from a small basic block which is allowed to grow to a preset large block as long as certain block correlation conditions are satisfied, whereas other algorithms are based on starting from a very large block which is successively subdivided if certain segmentation criteria are met. Furthermore, it utilizes the concept of an address code book whose entries consist of combinations of four addresses of the entries in the code book belonging to the next smaller size block. The proposed technique can be applicable to other applications, e.g., block segmentation, vector quantization of speech signals, etc., and offers a number of advantages.

The technique invented, and described in this invention, offers a number of significant advantages. The combining of the blocks in the lower layer and search process in the address code book terminates as soon as it is determined that not all lower layer blocks can be encoded by a single address. The best match of the basic blocks (in the super block), in the minimum distortion sense, is determined in layer 1 code book only once. There is no need to do any feature extraction or statistical parameter computation to determine the variable block size. There is no need to design multiple and/or large GLA-type code books to accommodate variable block size. And the performance, in terms of S/N ratio and subjective quality, is exactly the same as would be obtained if the whole image were compressed using the basic blocks of size M×M with the layer 1 code book, but at a much reduced bit rate.

The following features of the invention are believed to be new: 1) concept of defining a variable block size, where the basic block is grown to a super block; 2) design of layered basic and address code books where no computation is involved in using higher layer (>1) code tables; 3) application of (1) and (2) to vector quantization of images; and 4) ease of implementation in terms of computational and memory requirements.

Lastly, through examples, it is confirmed that the invention, described in this application, can deliver high quality images at a S/N ratio in excess of 30 dB at bit rates of lower than 0.2 bpp. The actual S/N ratio and bit rate depends on the specific image being coded.

We claim:

1. A method of compressing and reconstructing an image by a hierarchial variable block-size address-vector quantization, comprising the steps of:
    partitioning an image into basic blocks of equal size to form a first layer of blocks, each basic block having the same number of pixels;
    constructing a first layer pixel vector code book having a plurality of addressable entries, each entry representing a combination of elements which have appeared frequently in individual blocks of previously coded images;
    combining groups of adjacent basic blocks of said first layer to form a second layer of blocks;
    constructing an address code book for said second layer blocks having a plurality of addressable entries wherein said entries are addresses of combinations of code vectors in said first layer code book which have the highest probability of occurrence;
    determining a maximum block size and the number of layers N required to encode a maximum size block;
    if $N \geq 2$. combining groups of adjacent blocks from layer i−1 to form a layer i block, where $1 < i \leq N$;
    constructing an address code book for said ith layer of blocks having a plurality of addressable entries wherein said entries are those combinations of addresses vectors in said i−1 layer code book which have the highest probability of occurrence;
    storing said code books such that they may be used for both compression and reconstruction of the same images;
    dividing each newly arriving image into blocks of maximum size;
    dividing each of said maximum size blocks of said newly arriving image into basic blocks;
    comparing each of said basic blocks of said maximum size block with said entries in said first layer vector code book to find the best matches of all said basic blocks in said maximum block;
    scanning said address code book of said second layer to determine if there is an entry representing combinations of addresses of the best matches of adjacent basic blocks in said first layer code book;
    if all basic blocks of said first layer within the larger block of said second layer can be encoded by a single address in said second layer address code book, combining adjacent blocks of said second layer to form a larger block of a third layer;
    scanning said address code book of said third layer to determine if there is an entry representing the combination of addresses of second layer blocks of the previous step;
    if such an entry exists, then repeating the iterative steps of combining the blocks of layer i−1 to form a block of layer i; and
    scanning the address code book of layer i to find a single entry which represents the combination of addresses of blocks of layer i−1 in said layer i block;
    terminating said iterative steps upon occurrence of one of the following events:
    the maximum block size is reached and encoded;
    all of the component blocks of a block in layer i cannot be encoded by a single address vector entry in the address code book of layer i; and
    sending a tree message with block combination information and the code book addresses of the encoded image to a receiver for reconstruction of said image after transmission.

2. The method of claim 1 wherein:
    the size of basic block is M×M pixels; and said basic blocks are recursively combined in groups of four.

3. The method of claim 1 wherein said maximum size block contains N layers

4. The method of claim 2 wherein said maximum size block contains $2^{N-1}M \times 2^{N-1}M$ pixels.

5. The method of claim 2 wherein each entry in an address code book of layer i, where $2 \geq i \geq N$, contains four addresses of vectors in a code book of layer i−1.

6. The method of claim 1 wherein said first layer code book contains 128 vectors.

7. The method of claim 1 wherein said second layer code book contains 1024 address vectors.

8. The method of claim 1 wherein said second layer code book contains an number of address vectors.

9. The method of claim 1 wherein said third layer code book contains $\phi$ address vectors.

10. The method of claim 1 wherein said third layer code book contains any number of address vectors.

* * * * *